United States Patent [19]

Rosenberg

[11] Patent Number: 5,090,444
[45] Date of Patent: Feb. 25, 1992

[54] VALVE PARTICULARLY USEFUL FOR FLUSHING FLUID LINES

[76] Inventor: Peretz Rosenberg, Moshav Beit Shearim, Israel

[21] Appl. No.: 754,780

[22] Filed: Sep. 4, 1991

[30] Foreign Application Priority Data

Sep. 14, 1990 [IL] Israel .................................. 95689

[51] Int. Cl.⁵ .................................. F16K 17/30
[52] U.S. Cl. .................................. 137/495; 137/504
[58] Field of Search ............... 137/460, 495, 508, 509, 137/501, 504, 517; 251/128, 322, 323, 339

[56] References Cited

U.S. PATENT DOCUMENTS

| | | | |
|---|---|---|---|
| 1,759,798 | 5/1930 | Murphy et al. | 251/128 X |
| 2,158,715 | 5/1939 | Beekley et al. | 251/323 |
| 2,198,487 | 4/1940 | Sisk | 137/504 |
| 3,545,483 | 12/1970 | Valdenazzi | 137/495 X |
| 4,092,998 | 6/1978 | Taplin | 137/508 X |
| 4,133,345 | 1/1979 | Mitchell | 251/323 X |

*Primary Examiner*—Stephen M. Hepperle
*Attorney, Agent, or Firm*—Benjamin J. Barish

[57] ABSTRACT

A valve particularly useful for flushing a fluid line includes a spring-biased cylinder movable with respect to a fixed piston to control the discharge of flushing fluid through a housing outlet. The piston is fixed to the housing by a stem having a passageway in alignment with the housing outlet to thereby vent the interior of the cylinder to the atmosphere, and also to permit an instrument to be manually inserted through the housing outlet, the piston stem, and the piston, to engage the cylinder and to move it to its open position in order to manually flush the fluid line.

19 Claims, 2 Drawing Sheets

VALVE PARTICULARLY USEFUL FOR FLUSHING FLUID LINES

FIELD AND BACKGROUND OF THE INVENTION

The present invention relates to a valve particularly useful for flushing a fluid line, for example a lateral pipe of a water irrigation system.

When a lateral pipe of a water irrigation system is first filled with water, it is desired to have an outlet valve at the end of the lateral, which valve is normally open to permit the water entering the lateral to flush it of any dirt accumulating therein. As soon as the dirt is flushed through the valve at the end of the lateral, the valve automatically closes by the line pressure.

The opening and closing of such a valve is therefore done automatically. However, occasions may arise when it is desired to manually open the valve at the end of the lateral in order to manually flush the line.

OBJECTS AND BRIEF SUMMARY OF THE INVENTION

An object of the present invention is to provide a valve which conveniently permits the line to be manually flushed whenever desired.

Another object of the invention is to provide a valve of the foregoing which is normally open but automatically closes after the line has been flushed.

A further object of the invention is to provide a valve of the foregoing type which permits the valve to be adapted in a simple manner for different size laterals requiring different quantities of flushing water.

According to the present invention, there is provided a valve particularly useful for flushing a fluid line, comprising: a housing having an inlet connectable to the line, an outlet for discharging the flushing fluid, and a valve seat between the inlet and outlet and cooperable with a spring-biased cylinder movable with respect to a fixed piston to control the discharge of flushing fluid through the housing outlet; characterized in that the piston is fixed to the housing by a stem having a passageway extending therethrough and through the piston, which passageway is in alignment with the housing outlet to thereby vent the interior of the cylinder to the atmosphere, and also to permit an instrument to be manually inserted through the housing outlet, the piston stem, and the piston, to engage the cylinder and to move it to its open position with respect to the valve seat in order to manually flush the fluid line.

According to a further feature in the preferred embodiment of the invention described below, the housing inlet includes a pin receivable in a mating recess formed in the respective end of the cylinder for limiting the open position of the cylinder, and for guiding its movements to its open and closed positions.

According to yet another feature in the described preferred embodiment, the housing further includes a removable cap applied to the outlet end of the housing and formed with an opening aligned with the outlet opening and the piston stem, and of a preselected size corresponding to the preselected flushing rate of the fluid line. The cap is preferably color-coded according to preselected flushing rates to provide different flushing quantities corresponding to the length of the line to be flushed.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
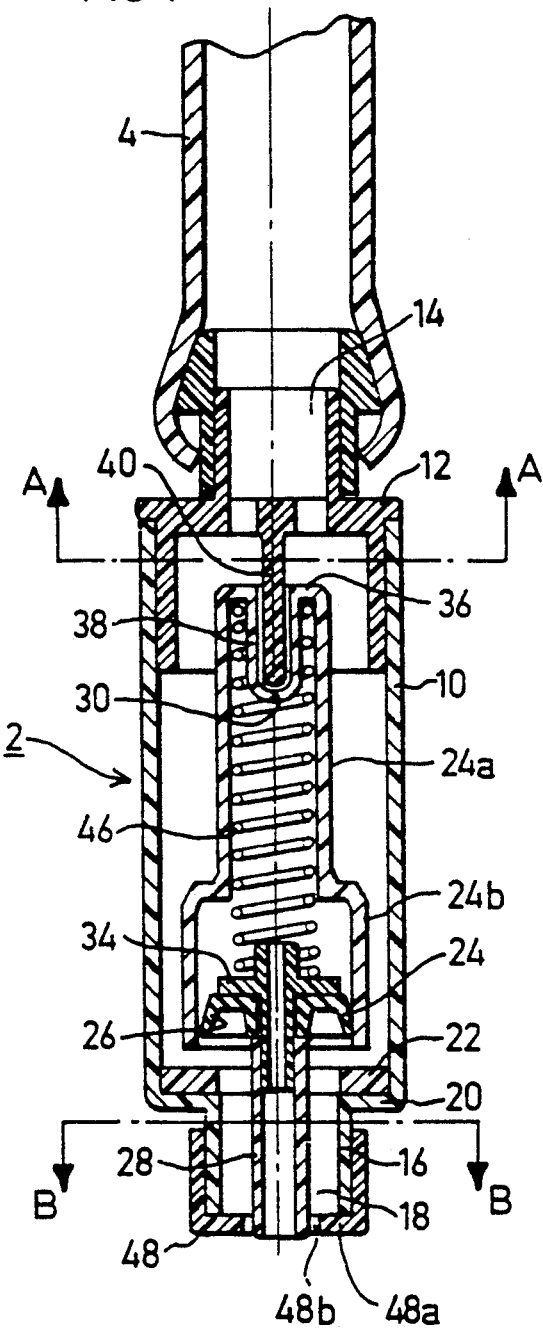
FIG. 1 illustrates one form of valve constructed in accordance with the present invention, the valve being shown in its normally open position.

The valve illustrated in the drawings, therein designated 2, is intended for attachment to the end of a water irrigation pipe or lateral 4 in order to effect the flushing of the lateral of any dirt accumulated therein as soon as the lateral is filled with pressurized water. Thus, the valve 2 is normally open so as to discharge the flushing water to the atmosphere; but as soon as full line pressure is applied to the lateral, the valve automatically closes to prevent any further discharge of water.

Valve 2 comprises a housing 10 having an end wall 12 at one end formed with an inlet 14 receiving the water from the lateral 4. The opposite end of housing 10 is reduced in diameter as shown at 16 to define an outlet 18 for discharging the flushing water to the atmosphere.

Section 16 of housing 10 further defines a annular shoulder 20 receiving an annular elastomeric ring 22 which serves as a seat for a valve member 24 movable towards and away from the valve seat in order to control the flow of the water discharge through outlet 18. Valve member 24 is in the form of a cylinder movable within housing 10. It cooperates with a piston 26 fixed within the housing adjacent to valve seat 22.

Figure 1A:
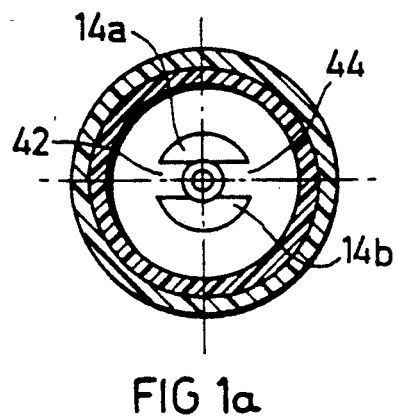
FIGS. 1a and 1b are sectional views along lines a—a and b—b in FIG. 1, respectively.
Figure 1B:
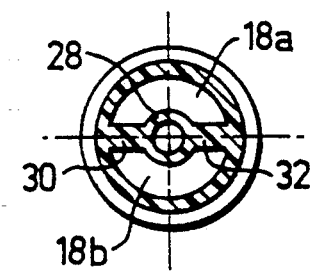

Thus, as shown particularly in FIG. 1b, piston 26 includes a hollow valve stem 28 fixed to housing section 16 by web portions 30, 32, dividing the outlet 18 into two sections 18a, 18b on the opposite sides of the hollow stem 28. The hollow stem 28 thus defines a passageway coaxial with the housing outlet 18. This passageway also passes through the center of the piston 26 and through a bearing ring 34 on the inner side of the piston, so that the interior of cylinder 24 is vented to the atmosphere.

The end of cylinder 24 facing the valve inlet 14 is in the form of a long section 24a of relatively small diameter, substantially smaller than the inner diameter of housing 10. The opposite end of the cylinder facing the outlet 18 is formed with a relatively short section 24b of larger diameter than section 24a, slightly smaller than the inner diameter of housing 10, The end of cylinder section 24a adjacent to the housing inlet 14 is closed by an end wall 36 formed with a relatively long axial recess or depression 38 centrally of the end wall. Recess 38 is adapted to receive a pin 40 fixed to end wall 12, attached to housing 10 by web portions 42, 44 (FIG. 1a), so that the inlet opening 14 is divided into two sections 14a, 14b (FIG. 1a) on opposite sides of pin 40.

Cylinder 24 is normally urged to its open position by a coiled spring 46 interposed between the cylinder 24 and the fixed piston 26. One end of spring 46 is received within the space between the end of cylinder section 24a and its central recess 38, whereas the opposite end of the spring bears against a bearing ring 34 carried by piston 26. Cylinder section 24a has an inner diameter substantially the same (preferably only slightly larger than) the outer diameter of the coiled spring 46 so as to stably retain the spring within the cylinder.

The valve illustrated in the drawings further includes a cap 48 applied to the outlet end section 16 of housing 10. Cap 48 includes an end wall 48a partially covering the outlet 18 defined by housing section 16. End wall 48a is formed with a central opening 48b aligned with the hollow piston stem 28.

The size of opening 48b in cap 48 thus fixes the rate of discharge of the water through the outlet 18, and thereby the amount of water that may be used for flushing the lateral 4 For example, where the valve 2 is to be used with long laterals, a cap 48 would be selected to have a relatively large central opening 48b so as to permit more water to be used for flushing the lateral before the valve automatically closes. Cap 48 may be applied by a frictional fit to housing section 16 and may be color-coded according to the flushing rates, to thereby enable the user, by appropriate selection of the cap 48, to adapt the valve 2 to any desired flushing rate corresponding to the lateral with respect to which the valve is to be used.

The valve illustrated in the drawings operates to flush the lateral 4 in the following manner:

When the lateral 4 is empty of water, cylinder 24 is urged to its open position with respect to valve seat 22 by coiled spring 46, as shown in FIG. 1. Accordingly, the initial water used for filling the lateral 4 is permitted to flow through the housing inlet 14 and out through its outlet 18, thereby flushing out any dirt accumulated within the lateral.

As soon as the lateral is full with the water under the full line pressure, the line pressure is applied to cylinder 24 to thereby move it, against spring 46, towards valve seat 22 to close the housing outlet 18. The shape of cylinder 24 facilitates this closing of the valve. Thus, the larger-diameter section 24b of cylinder 24 adjacent to the valve seat 22 increases the velocity of the water flowing through the valve to the housing outlet 18, thereby tending to move the cylinder towards valve seat 22 during this flushing operation; and as soon as full line pressure is applied, the cylinder is moved into firm contact with the valve seat 22, thereby closing the housing outlet 18.

Figure 2:
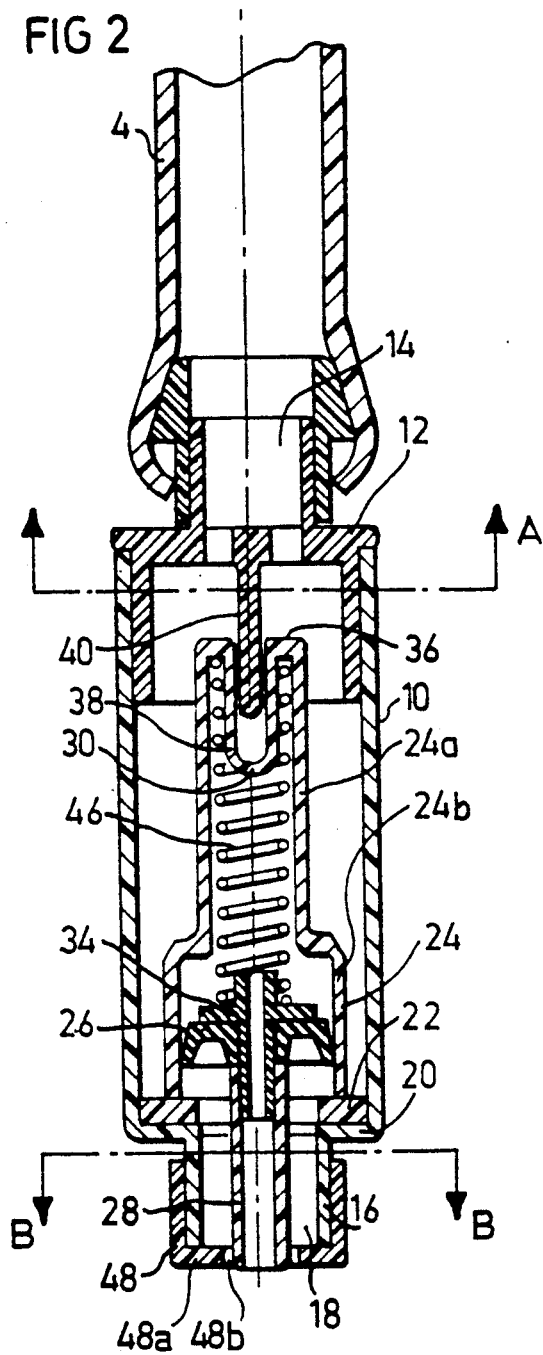
FIG. 2 is a view corresponding to that of FIG. 1 but showing the valve in its closed condition.

The open position of cylinder 24 is fixed by pin 40 engaging the recessed end wall 30 of cylinder 24. Pin 40 also guides the movement of cylinder 24 towards its closing position against valve seat 22 as shown in FIG. 2.

It will thus be seen that the valve illustrated in the drawings is normally open so as to flush the lateral 4 when the lateral is first filled with water, and automatically closes after the flushing has been completed. When the lateral is again emptied of water, the valve will automatically open and thereby be in condition to reflush the lateral when it is next refilled with water.

Figure 3:
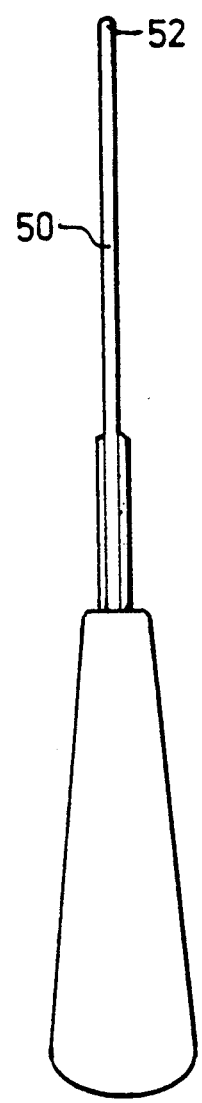
FIG. 3 illustrates an implement which may be used with the valve of FIGS. 1 and 2 for manually opening the valve to flush the line.

However, it may be desirable during the normal operation of the water irrigation system, i.e., when the lateral 4 is filled with pressurized water, to manually flush the lateral. This may be easily accomplished with the valve illustrated in the drawings by using an implement, such as shown at 50 in FIG. 3.

Thus, when valve 2 is in its closed condition (FIG. 2) during the normal operation of the water irrigation system in which the valve is used, end 52 of implement 50 may be inserted through the hollow piston stem 28, the passageway through piston 26, and its bearing ring 34, to engage end wall 30 of the cylinder 24. Implement 50 may thus be used to force the cylinder to its open position illustrated in FIG. 1, i.e., away from valve seat 22 to flush the lateral, despite the pressure on the cylinder in the lateral. As soon as the opening force applied by implement 50 against cylinder 24 is removed, the cylinder automatically returns to its closed condition against valve seat 22 to terminate the flushing.

Cap 48, particularly the size of its opening 48b through its end wall 48a, determines the flushing rate, and thereby the quantity of flushing water passed through the lateral before the valve is closed. Thus, if the lateral is relatively long, it will be desired to provide a relatively large quantity of flushing water, and therefore cap 48 would be selected with a relatively large opening 48b. Color-coding the cap for different flushing rates facilitates the selection of the appropriate cap for any particular lateral.

While the invention has been described with respect to one preferred embodiment, it will be appreciated that many variations, modifications and other applications of the invention ma be made.

What is claimed is:

1. A valve particularly useful for flushing a fluid line, comprising:
 a housing having an inlet connectable to the line, an outlet for discharging the flushing fluid, and a valve seat between said inlet and outlet and cooperable with a spring-biased cylinder movable with respect to a fixed piston to control the discharge of flushing fluid through the housing outlet;
 characterized in that said piston is fixed to the housing by a stem having a passageway extending therethrough and through the piston, which passageway is in alignment with said housing outlet to thereby vent the interior of the cylinder to the atmosphere, and also to permit an instrument to be manually inserted through the housing outlet, the piston stem, and the piston, to engage the cylinder and to move it to its open position with respect to the valve seat in order to manually flush the fluid line.

2. The valve according to claim 1, wherein said housing inlet includes a pin receivable in a mating recess formed in the respective end of the cylinder for limiting the open position of the cylinder, and for guiding its movements to its open and closed positions.

3. The valve according to claim 2, wherein said pin is carried by the end wall of the housing defining the inlet thereof.

4. The valve according to claim 2, wherein the end of the cylinder adjacent said valve seat is of larger diameter than the end of the cylinder adjacent the housing inlet, such that the fluid passageway between the cylinder and housing is of smaller cross-sectional area adjacent the valve seat, causing the fluid velocity to increase adjacent the valve seat and thereby to aid the cylinder to start the movement to its closed position when the line is first filled with the fluid.

5. The valve according to claim 4, wherein said cylinder is urged by a coiled spring to its open position, and is formed with a long section of a small inner diameter substantially equal to the outer diameter of, and receiving, the coiled spring, terminating at one end by said end wall formed with said mating recess receiving the pin, the opposite end of said long section of the cylinder being connected to a shorter section of the cylinder, open at the end adjacent the valve seat and of larger diameter than said long section, to define said fluid passageway of smaller cross-sectional area.

6. The valve according to claim 1, wherein said housing further includes a removable cap applied to the outlet end of the housing and formed with an opening aligned with the outlet opening and the piston stem, and of a preselected size corresponding to the preselected flushing rate of the fluid line.

7. The valve according to claim 6, wherein said cap is color-coded according to a preselected flushing rate.

8. A valve particularly useful for flushing a fluid line, comprising:
   a housing having an inlet connectable to the line, an outlet for discharging the flushing fluid, and a valve seat between said inlet and outlet and cooperable with a spring-biased cylinder movable with respect to a fixed piston to control the discharge of flushing fluid through the housing outlet;
   said piston being fixed to the housing by a stem having a passageway extending therethrough and through the piston, which passageway is in alignment with said housing outlet to thereby vent the interior of the cylinder to the atmosphere, and also to permit an instrument to be manually inserted through the housing outlet, the piston stem, and the piston, to engage the cylinder and to move it to its open position with respect to the valve seat in order to manually flush the fluid line;
   said housing further including a removable cap applied to the outlet end of the housing and formed with an opening aligned with the outlet opening and the piston stem, and of a preselected size corresponding to the preselected flushing rate of the fluid line.

9. The valve according to claim 8, wherein said cap is color-coded according to a preselected flushing rate.

10. The valve according to claim 8, wherein said housing inlet includes a pin receivable in a mating recess formed in the respective end of the cylinder for limiting the open position of the cylinder, and for guiding its movements to its open and closed positions.

11. The valve according to claim 10, wherein said pin is carried by the end wall of the housing defining the inlet thereof.

12. The valve according to claim 11, wherein the end of the cylinder adjacent said valve seat is of larger diameter than the end of the cylinder adjacent the housing inlet, such that the fluid passageway between the cylinder and housing is of smaller cross-sectional area adjacent the valve seat, causing the fluid velocity to increase adjacent the valve seat and thereby to aid the cylinder to start the movement to its closed position when the line is first filled with the fluid.

13. The valve according to claim 12, wherein said cylinder is urged by a coiled spring to its open position, and is formed with a long section of a small inner diameter substantially equal to the outer diameter of, and receiving, the coiled spring, terminating at one end by said end wall formed with said mating recess receiving the pin, the opposite end of said long section of the cylinder being connected to a shorter section of the cylinder, open at the end adjacent the valve seat and of larger diameter than said long section, to define said fluid passageway of smaller cross-sectional area.

14. A valve particularly useful for flushing a fluid line, comprising:
   a housing having an inlet connectable to the line, an outlet for discharging the flushing fluid, and a valve seat between said inlet and outlet;
   a spring-biased cylinder movable with respect to a fixed piston cooperable with said valve seat to control the discharge of flushing fluid through the housing outlet;
   said piston being fixed to the housing by a stem having a passageway extending therethrough and through the piston, which passageway is in alignment with said housing outlet to thereby vent the interior of the cylinder to the atmosphere, and also to permit an instrument to be manually inserted through the housing outlet, the piston stem, and the piston, to engage the cylinder and to move it to its open position with respect to the valve seat in order to manually flush the fluid line;
   said housing inlet including a pin receivable in a mating recess formed in the respective end of the cylinder for limiting the open position of the cylinder, and for guiding its movements to its open and closed positions.

15. The valve according to claim 14, wherein said pin is carried by the end wall of the housing defining the inlet thereof.

16. The valve according to claim 14, wherein the end of the cylinder adjacent said valve seat is of larger diameter than the end of the cylinder adjacent the housing inlet, such that the fluid passageway between the cylinder and housing is of smaller cross-sectional area adjacent the valve seat, causing the fluid velocity to increase adjacent the valve seat and thereby to aid the cylinder to start the movement to its closed position when the line is first filled with the fluid.

17. The valve according to claim 16, wherein said cylinder is urged by a coiled spring to its open position, and is formed with a long section of a small inner diameter substantially equal to the outer diameter of, and receiving, the coiled spring, terminating at one end by said end wall formed with said mating recess receiving the pin, the opposite end of said long section of the cylinder being connected to a shorter section of the cylinder, open at the end adjacent the valve seat and of larger diameter than said long section, to define said fluid passageway of smaller cross-sectional area.

18. The valve according to claim 14, wherein said housing further includes a removable cap applied to the outlet end of the housing and formed with an opening aligned with the outlet opening and the piston stem, and of a preselected size corresponding to the preselected flushing rate of the fluid line.

19. The valve according to claim 18, wherein said cap is color-coded according to a preselected flushing rate.

* * * * *